United States Patent
Shih et al.

(10) Patent No.: US 7,875,335 B2
(45) Date of Patent: Jan. 25, 2011

(54) METHOD OF FABRICATING POLISHING PAD HAVING DETECTION WINDOW THEREON

(75) Inventors: Wen-Chang Shih, TaiChung (TW); Yung-Chung Chang, Taipei (TW); Min-Kuei Chu, Taichung (TW); Lung-Chen Wei, Taichung (TW)

(73) Assignee: IV Technologies Co., Ltd., Taiching (TW)

( * ) Notice: Subject to any disclaimer, the term of this patent is extended or adjusted under 35 U.S.C. 154(b) by 767 days.

(21) Appl. No.: 11/410,756

(22) Filed: Apr. 24, 2006

(65) Prior Publication Data

US 2006/0198992 A1    Sep. 7, 2006

Related U.S. Application Data

(63) Continuation of application No. 10/438,663, filed on May 14, 2003, now abandoned.

(30) Foreign Application Priority Data

Nov. 19, 2002  (TW) .............................. 91133681 A

(51) Int. Cl.
*B32B 3/10*  (2006.01)
(52) U.S. Cl. .................. 428/141; 428/409; 451/298; 451/526; 451/527; 451/533; 451/548; 51/298; 51/299; 51/300; 156/293; 156/303.1; 264/46.4; 264/271.1

(58) Field of Classification Search ................. 428/141, 428/409; 451/298, 526, 527, 533, 548; 51/298, 51/299, 300; 156/293, 303.1; 264/46, 271.14, 264/46.4, 271.1
See application file for complete search history.

(56) References Cited

U.S. PATENT DOCUMENTS 5,605,760 A    2/1997   Roberts ...................... 428/409

(Continued)

FOREIGN PATENT DOCUMENTS

JP    2002324769 A   * 11/2002

(Continued)

OTHER PUBLICATIONS

Rohm and Haas, "IC1000 Polishing Pad", accessed on Dec. 18, 2009 from www.salemdist.com/precision/pdf/tech/pads/c_Special_Application/TECH_IC.pdf.*

(Continued)

*Primary Examiner*—William P Watkins, III
(74) *Attorney, Agent, or Firm*—Ditthavong Mori & Steiner, P.C.

(57) ABSTRACT

The present invention provides a polishing pad. The polishing pad comprises a transparent part and a high molecular weight layer. The transparent part has an uneven side surface and the profile of the uneven side surface is selected from a group consisting of a serrated shape, a wavy shape and a toothed shape. The high molecular weight layer encircles the transparent part.

29 Claims, 4 Drawing Sheets

U.S. PATENT DOCUMENTS

| | | | |
|---|---|---|---|
| 5,893,796 A * | 4/1999 | Birang et al. | 451/526 |
| 6,108,091 A * | 8/2000 | Pecen et al. | 356/630 |
| 6,395,130 B1 * | 5/2002 | Adams et al. | 156/345.13 |
| 6,696,005 B2 | 2/2004 | Strasbaugh | 264/263 |
| 6,832,950 B2 | 12/2004 | Wright et al. | 451/490 |
| 6,875,077 B2 | 4/2005 | Petroski et al. | 451/6 |
| 6,878,039 B2 * | 4/2005 | Yang et al. | 451/6 |
| 7,241,408 B2 * | 7/2007 | Shih et al. | 264/46.4 |
| 2001/0036805 A1 | 11/2001 | Birang et al. | 451/527 |

FOREIGN PATENT DOCUMENTS

| | | |
|---|---|---|
| WO | WO 01/94074 A1 * | 12/2001 |
| WO | WO 0226445 A1 * | 4/2002 |

OTHER PUBLICATIONS

Rohm and Haas, "Suba Products", accessed on Dec. 18, 2009 from www.salemdist.com/precision/pdf/tech/pads/a_Primary_Polish/TECH_SUBA.pdf.*

Dymax Corporation, "Multi-Purpose Optical Adhesive OP-29 Series", accessed on Dec. 18, 2009 from www.blaze.com.sg/NewIntra/PDS/OP%20Series/OP-29-Series.pdf.*

* cited by examiner

METHOD OF FABRICATING POLISHING PAD HAVING DETECTION WINDOW THEREON

CROSS-REFERENCE TO RELATED APPLICATION

This is a continuation of a prior application Ser. No. 10/438,663, filed on May 14, 2003 now abandoned, which claims the priority benefit of Taiwan application serial no. 91133681, filed on Nov. 19, 2002. All disclosures are incorporated herewith by reference.

BACKGROUND OF THE INVENTION

1. Field of Invention

The present invention relates to a method of fabricating a polishing pad. More particularly, the present invention relates to a method of fabricating a polishing pad having a detection window thereon.

2. Description of Related Art

For the semiconductor manufacture of integrated circuits, it is necessary to increase the aspect ratios and the levels of conductive lines in order to increase density of electric components and reduce the production cost. For the wafer with multilevel metalization and/or high aspect ratios, it is complex and difficult to achieve good planarization. Chemical mechanical polishing (CMP) is so far one of the best technologies to achieve global planarization for very large semiconductor integration (VLSI) or even ultra large semiconductor integration (ULSI). This CMP technology was first proposed by the corporation IBM in the USA, and applied in the damascene fabrication of embedded conductive lines.

In general, chemical mechanical polishing relies on the relative movement between the resilient and hard polishing pad and the slurry (small particle suspension), acting on the surface of the wafer for planarization. While the polishing pad moves and presses on the surface of the wafer, the abrasive particles in the slurry are pressed to the surface of the wafer. The friction between the slurry particles and the wafer surface leads to abrasive action (loss) of the wafer, so that the uneven surface of the wafer is planarized and topology of the wafer is refined.

A transparent window is usually designed to be disposed within a specific area of the polishing pad for monitoring the polishing situations. The user can monitor the abrasive situation and control the polishing conditions through the transparent window and the platform setup. Therefore, the transparent window is regarded as the end-point detection of the polishing for the polishing pad.

The prior art method of fabricating the detection window is described in U.S. Pat. No. 5,605,760. In one embodiment, the polishing pad is a transparent sheet made of solid uniform polymer. Alternatively, the polishing pad is opaque and has a transparent window. The transparent window is fabricated by casting a rod or plug of the transparent polymer. This transparent casting is either inserted into the opaque pad before molding or after molding. If the transparent casting is inserted into the polishing pad in mold, because the materials of the polishing pad and the transparent window are different, the contraction difference between the polishing pad and the transparent window may cause the transparent window to be distorted or deformed. Even if the transparent window is inserted into the cut of the polishing pad after molding, the incomplete contact between the polishing pad and the transparent window may cause slurry leakage, thus deteriorating the polishing quality of the wafer.

U.S. Pat. No. 5,893,796 discloses a polishing pad having a transparent window. The transparent window is fabricated by placing a solid transparent insert into the bulk molten polishing pad material, so that the window is integrally molded into the polishing pad. However, the transparent window is made of high polishing resistant materials, while the polishing pad is made of low polishing resistant materials. Therefore, the polishing pad has a higher attrition rate, while the transparent window wears down (polished) at a lower rate, which creates height difference between the polishing pad and the detection window and causes cracking of the polishing pad around the transparent window. This height difference of the polishing pad further leads to non-uniform polishing on the wafer and defects on the surface of the wafer.

SUMMARY OF THE INVENTION

The present invention provides a polishing pad having a detection window, which can improve the prior problems, such as distortion or warp, of the transparent window.

The present invention provides a polishing pad having a detection window, for improving the slurry leakage problems resulting from in-complete contact between the polishing pad and the transparent window.

The present invention provides a polishing pad having a detection window, which increases the polishing uniformity of the polishing pad having a detection window.

As embodied and broadly described herein, the present invention provides a polishing pad. The polishing pad comprises a transparent part and a high molecular weight layer. The transparent part has an uneven side surface and the profile of the uneven side surface is selected from a group consisting of a serrated shape, a wavy shape and a toothed shape. The high molecular weight layer encircles the transparent part.

According to one embodiment of the present invention, a material of the transparent part is a thermosetting plastic. Moreover, the material of the transparent part is selected from the following group consisting of a fully transparent high molecular weight material and a semi-transparent high molecular weight material. Further, the material of the transparent part is selected from the following group consisting of acrylic resin (PMMA), polyurethane (PU), polyvinyl chloride (PVC), epoxy resin and unsaturated polyester (UP). Also, the transparent part has a central portion thicker than a peripheral portion and the transparent part has a shape selected from the following group consisting of round, elliptical and tetragonal. In addition, the high molecular weight layer is a polyurethane foam layer and the high molecular weight layer has an attrition rate equivalent to that of the transparent part. Furthermore, the polishing pad comprises a thermal adhesive disposed between the transparent part and the high molecular weight layer.

As embodied and broadly described herein, the present invention provides a polishing pad. The polishing pad comprises a transparent part, a first high molecular weight layer and a second high molecular weight layer. The transparent part has an uneven side surface and the profile of the uneven side surface is selected from a group consisting of a serrated shape, a wavy shape and a toothed shape. The first high molecular weight layer encircles a lower portion of the transparent part. The second high molecular weight layer is disposed on the first high molecular weight layer and encloses an upper portion of the transparent part.

According to one embodiment of the present invention, a material of the transparent part is a thermosetting plastic. Moreover, the material of the transparent part is selected from the following group consisting of a fully transparent high molecular weight material and a semi-transparent high molecular weight material. Also, the material of the transparent part is selected from the following group consisting of acrylic resin (PMMA), polyurethane (PU), polyvinyl chloride (PVC), epoxy resin and unsaturated polyester (UP). In addition, the transparent part has a central portion thicker than a peripheral portion and the transparent part has a shape selected from the following group consisting of round, elliptical and tetragonal. Further, the first high molecular weight layer is a polyurethane foam layer and the first high molecular weight layer has an attrition rate equivalent to that of the transparent part. The material of the second high molecular weight layer is selected from the following group consisting of polyurethane (PU), silicon rubber, polybutyl rubber (PBR), polyvinyl chloride (PVC) latex and polyacrylic acid series (PMMA) latex. Also, the first high molecular weight layer has a hardness larger than that of the second high molecular weight layer. Furthermore, the polishing pad comprises a thermal adhesive disposed between the transparent part and the first high molecular weight layer and the polishing pad further comprises a thermal adhesive disposed between the transparent part and the second high molecular weight layer.

As embodied and broadly described herein, the present invention provides a polishing pad. The polishing pad comprises a transparent part, a high molecular weight layer and a thermal adhesive. The transparent part has a side surface. The high molecular weight layer encircles the transparent part and the thermal adhesive is disposed between the high molecular weight layer and the side surface of the transparent part.

According to one embodiment of the present invention, a material of the transparent part is a thermosetting plastic. Further, a material of the transparent part is selected from the following group consisting of a fully transparent high molecular weight material and a semi-transparent high molecular weight material. Moreover, a material of the transparent part is selected from the following group consisting of acrylic resin (PMMA), polyurethane (PU), polyvinyl chloride (PVC), epoxy resin and unsaturated polyester (UP). Also, the transparent part has a central portion thicker than a peripheral portion and the transparent part has a shape selected from the following group consisting of round, elliptical and tetragonal. The high molecular weight layer is a polyurethane foam layer and the high molecular weight layer has an attrition rate equivalent to that of the transparent part. Further, the side surface of the transparent part is an uneven surface. The side surface of the transparent part is configured to have a shape selected from the following group consisting of a serrated shape, a wavy shape and a toothed shape.

In addition, the transparent detection window mentioned in the previous embodiments can be designed to have a curved bottom. In other words, the transparent detection window is thicker in the center and thinner in the rim. This design can help to eliminate the deformation resulting from the material variance of the polishing pad and the detection window.

It is to be understood that both the foregoing general description and the following detailed description are exemplary, and are intended to provide further explanation of the invention as claimed.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention. In the drawings.

DESCRIPTION OF THE PREFERRED EMBODIMENTS

FIGS. 1-4 are cross-sectional views of the process steps for the manufacturing method of the polishing pad with a detection window according to one preferred embodiment of the present invention.

Figure 1:
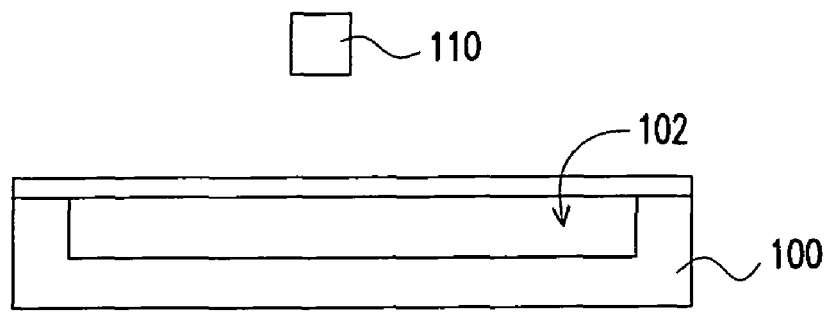
FIGS. 1-4 are display views of the process steps for the manufacturing method of the polishing pad with a detection window according to one preferred embodiment of the present invention.

Referring to FIG. 1, a mold 100 having a cavity 102 and a transparent thermosetting plastic part 110 are provided. So far, the transparent thermosetting plastic part 110 is not completely hardened. The parent thermosetting plastic part 110 is made of, for example, a fully transparent high molecular weight material or a semi-transparent high molecular weight material. For example, the material of the transparent thermosetting plastic part 110 is acrylic resin (PMMA), polyurethane (PU), polyvinyl chloride (PVC), epoxy resin or unsaturated polyester (UP). The transparent thermosetting plastic part 110 has a hardness ranging from 70 Shore A to 75 Shore D.

Figure 2:
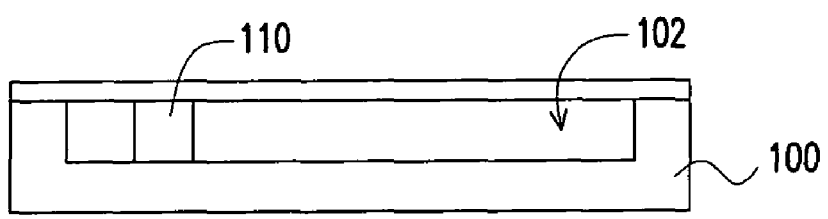

Referring to FIG. 2, the transparent thermosetting plastic part 110 is placed inside the cavity 102 of the mold 100. The bottom of the transparent thermosetting plastic part 110 is in tight contact to the bottom surface of the mold 100. The transparent thermosetting plastic part 110 is adhered to the mold 100, so as to increase the stability and accuracy for the following processes.

Figure 3:
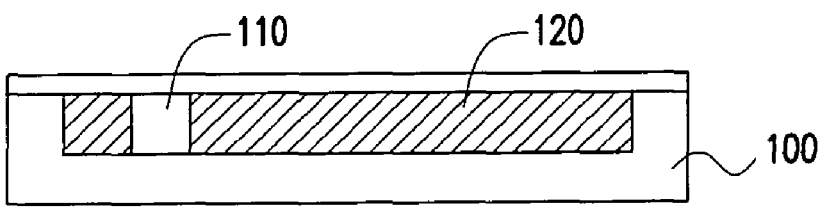

Referring to FIG. 3, a high molecular weight foam 120 is injected into the cavity 102 of the mold 100 by molding, so that the transparent thermosetting plastic part 110 is surrounded by the high molecular weight foam 120. The transparent thermosetting plastic part 110 and the high molecular weight foam 120 become completely hard (hardened) at the same time. In this embodiment, the injected high molecular weight foam 120 fills up the cavity 102. The high molecular weight foam 120 is, for example, a PU foam. The molding methods include thermoplastic injection-molding, thermosetting injection-molding (usually reaction injection-molding), thermoplastic or thermosetting injection blow-molding, thermo-extrusion molding or other similar methods.

Figure 5:
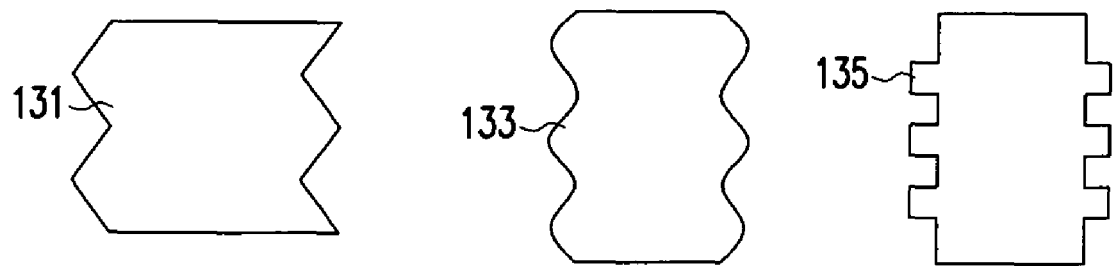
FIG. 5 is a display side view illustrating the shape of the side surfaces of the transparent thermosetting plastic part.

In order to make sure the transparent thermosetting plastic part 110 is in good (tight) contact with the high molecular weight foam 120, the side surface of the transparent thermosetting plastic part 110 is designed to be an uneven and rugged surface. From the side view (as shown in FIG. 5), the side surface of the transparent thermosetting plastic part 110 is, for example, in a serrated shape 131, in a wavy shape 133 or a toothed shape 135. Since the side surface of the transparent thermosetting plastic part 110 is uneven, the total contact area between the transparent thermosetting plastic part 110 and the high molecular weight foam 120 is increased, further strengthening the connection.

In addition, the transparent thermosetting plastic part 110 can be designed to be round, elliptical, tetragonal or in any other suitable shapes, from the top view. Preferably, the transparent thermosetting plastic part 110 is in an elliptical shape, from the top view.

Figure 4:
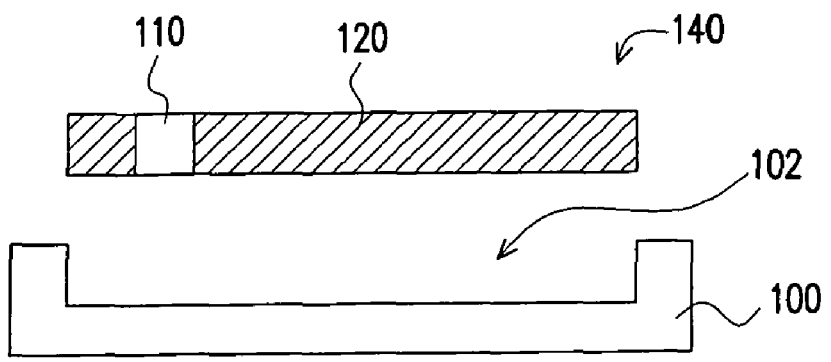

Referring to FIG. 4, after the transparent thermosetting plastic part 110 and the high molecular weight foam become completely hardened, demolding is performed to remove the polishing pad 140 from the mold 100. The transparent thermosetting plastic part 110 within the polishing pad 140 is used as a detection window. There is a uniform attrition (polishing) rate toward the whole polishing pad 140. That is, the high molecular weight foam 120 in the polishing pad 140 has a polishing rate equivalent to that of the detection window (transparent thermosetting plastic part 110).

Figure 6:
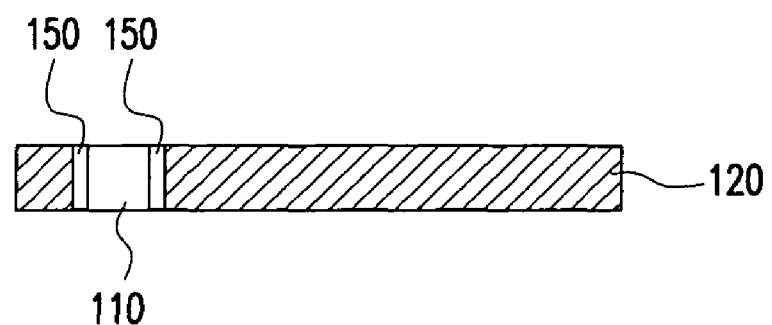
FIG. 6 is a display view illustrating the side surface of the transparent thermosetting plastic part, while the side surface is coated with an incomplete reactive material.

The method of the present invention further comprises coating an incomplete reactive material to the side surface of the transparent thermosetting plastic part 110, for strengthening the attachment of the transparent thermosetting plastic part 110 and the high molecular weight foam 120. The incomplete reactive material is, for example, a thermal adhesive 150, as shown in FIG. 6. Because of chemical bonding, the thermal adhesive 150 enhances adhesion of the transparent thermosetting plastic part 110 and the high molecular weight foam 120.

FIGS. 7-12 are cross-sectional views of the process steps for the manufacturing method of the polishing pad with a detection window according to another preferred embodiment of the present invention.

Figure 7:
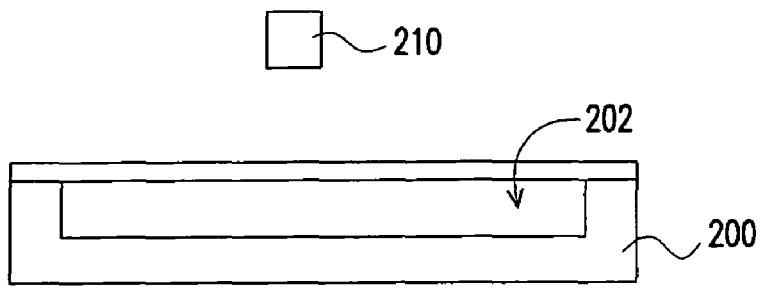
FIGS. 7-11 are display views of the process steps for the manufacturing method of the polishing pad with a detection window according to another preferred embodiment of the present invention.

Referring to FIG. 7, a mold 200 having a cavity 202 and a transparent thermosetting plastic part 210 are provided. So far, the transparent thermosetting plastic part 210 is not completely hardened. The parent thermosetting plastic part 210 is made of, for example, a fully transparent high molecular weight material or a semi-transparent high molecular weight material. For example, the material of the transparent thermosetting plastic part 210 is acrylic resin (PMMA), polyurethane (PU), polyvinyl chloride (PVC), epoxy resin or unsaturated polyester (UP). The transparent thermosetting plastic part 210 has a hardness ranging from 70 Shore A to 75 Shore D.

Figure 8:
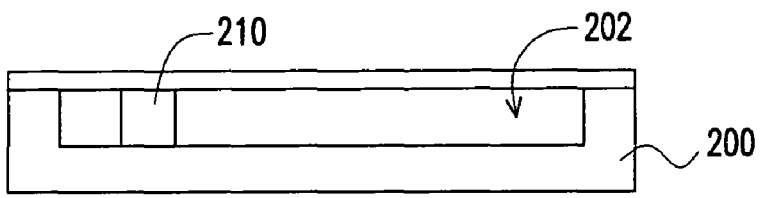

Referring to FIG. 8, the transparent thermosetting plastic part 210 is placed inside the cavity 102 of the mold 200. The bottom of the transparent thermosetting plastic part 210 is in tight contact to the bottom surface of the mold 200. The transparent thermosetting plastic part 210 is adhered to the mold 200, so as to increase the stability and accuracy for the following processes.

Figure 9:
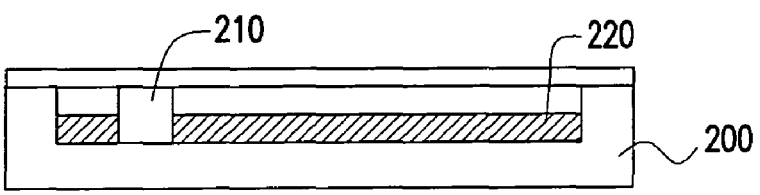

Referring to FIG. 9, a high molecular weight foam 220 is injected into the cavity 202 of the mold 200 by molding, so that the transparent thermosetting plastic part 210 is encircled by the high molecular weight foam 220 and the cavity 202 is partially filled by the high molecular weight foam 220. The high molecular weight foam 220 is hardened for about 3-5 minutes. In this embodiment, the high molecular weight foam 220 is, for example, a PU foam. The molding methods include thermoplastic injection-molding, thermosetting injection-molding (usually reaction injection-molding), thermoplastic or thermosetting injection blow-molding, thermo-extrusion molding or other similar methods.

Figure 10:
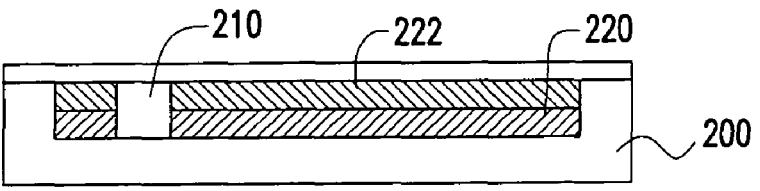

Referring to FIG. 10, a high molecular weight material layer 222 is injected into the cavity 202 and on the high molecular weight foam 220 in the mold 200 by molding. The transparent thermosetting plastic part 210 is also encircled by the high molecular weight material layer 222 and the cavity 202 is fully filled by the high molecular weight material layer 222. The transparent thermosetting plastic part 210, the high molecular weight foam 220 and the high molecular weight material layer 222 become completely hardened (hard) at the same time. In this embodiment, the high molecular weight foam 220 has a hardness larger (higher) than that of the high molecular weight material layer 222. Therefore, the high molecular weight material layer 222 is used as a buffer layer. The high molecular weight material layer 222 is made of, for example, polyurethane (PU), silicon rubber, polybutyl rubber (PBR), polyvinyl chloride (PVC) latex or polyacrylic acid series (PMMA) latex. The high molecular weight foam 220 has a hardness ranging from 30 Shore D to 80 Shore D, while the high molecular weight material layer 222 has a hardness ranging from 5 Shore A to 60 Shore A, for example. The molding methods include thermoplastic injection-molding, thermosetting injection-molding (usually reaction injection-molding), thermoplastic or thermosetting injection blow-molding, thermo-extrusion molding or other similar methods.

In order to make sure the transparent thermosetting plastic part 210 is in good (tight) contact to the high molecular weight foam 220 and the high molecular weight material layer 222, the side surface of the transparent thermosetting plastic part 210 is designed to be an uneven and rugged surface. From the side view, the side surface of the transparent thermosetting plastic part 210 is, for example, in a serrated shape 131, in a wavy shape 133 or a toothed shape 135 (as shown in FIG. 5). Since the side surface of the transparent thermosetting plastic part 210 is uneven, the total contact area between the transparent thermosetting plastic part 210, the high molecular weight foam 220 and the high molecular weight material layer 222 is increased, further strengthening the connection between the above three.

In addition, the transparent thermosetting plastic part 210 can be designed to be round, elliptical, tetragonal or in any other suitable shape, from the top view. Preferably, the transparent thermosetting plastic part 210 is in an elliptical shape, from the top view.

Figure 11:
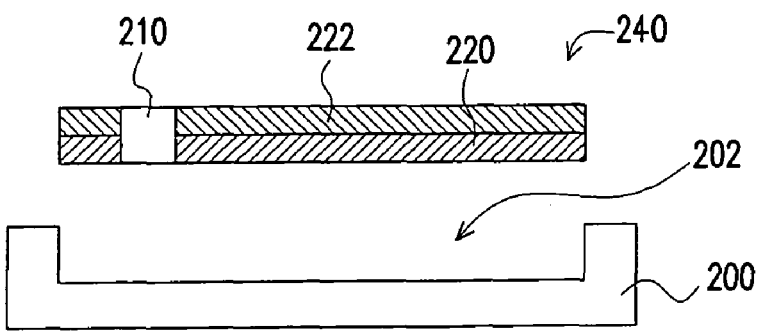

Referring to FIG. 11, after the transparent thermosetting plastic part 210, the high molecular weight foam 220 and the high molecular weight material layer 222 become completely hardened, demolding is performed to remove the polishing pad 240 from the mold 200. The transparent thermosetting plastic part 210 within the polishing pad 240 is used as a detection window. There is a uniform attrition (polishing) rate toward the whole polishing pad 240. That is, the high molecular weight foam 220 in the polishing pad 240 has a polishing rate equivalent to that of the detection window (transparent thermosetting plastic part 210).

Figure 12:
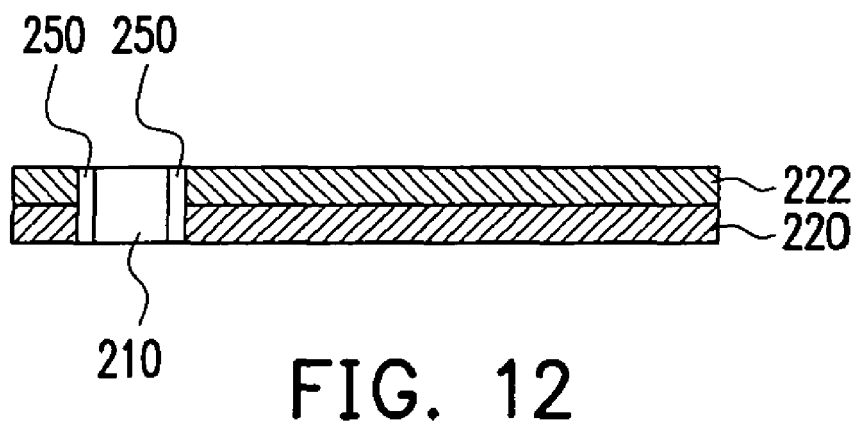
FIG. 12 is a display view illustrating the side surface of the transparent thermosetting plastic part, while the side surface is coated with an incomplete reactive material.

The method of the present invention further comprises coating an incomplete reactive material to the side surface of the transparent thermosetting plastic part 210, for strengthening the attachment of the transparent thermosetting plastic part 210, the high molecular weight material layer 222 and the high molecular weight foam 220. The incomplete reactive material is, for example, a thermal adhesive 250, as shown in FIG. 12. Because of the chemical bonding, the thermal adhesive 250 can enhance adhesion of the transparent thermosetting plastic part 210, the high molecular weight material layer 222 and the high molecular weight foam 220.

Figure 13:
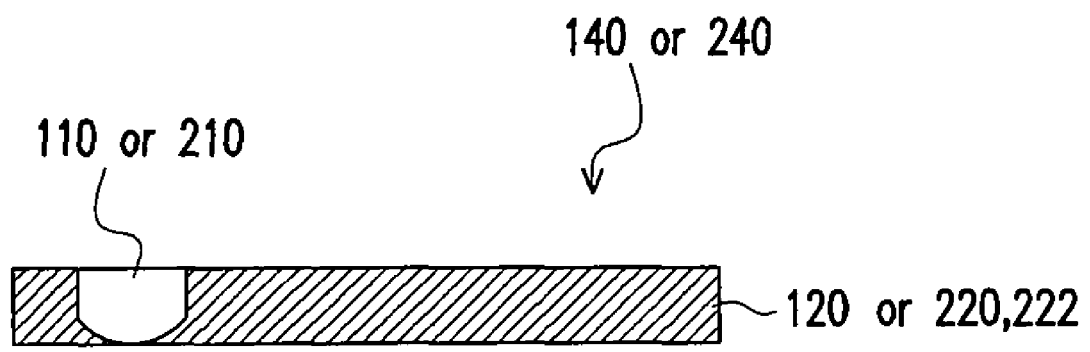
FIG. 13 is a display view illustrating the design of the thermosetting plastic part having a thicker center and a thinner border.

Furthermore, the transparent detection window 110, 210 mentioned in the previous embodiments can be designed to have a curved bottom (as shown in FIG. 13). In other words, the transparent detection window 110/210 is thicker in the center and thinner in the rim. This design can help to eliminate the deformation resulting from the material variance of the polishing pad 140/240 and the detection window 110/210.

Hereafter, FIGS. 4, 5, 6 and 13 are used to describe a polishing pad structure of one embodiment according to the present invention. In this embodiment, as shown in FIG. 4, a polishing pad 140 is provided. The polishing pad 140 comprises a transparent part 110 and a high molecular weight layer 120. It should be noticed that, the transparent part 110 can, for example, have an uneven side surface and the profile of the uneven side surface can be, for example, selected from a group consisting of a serrated shape 131, a wavy shape 133 and a toothed shape 135 shown in FIG. 5. In addition, the material of the transparent part 110 can be, for example, a thermosetting plastic. Moreover, the material of the transparent part 110 can be, for example but not limited to, selected from the following group consisting of a fully transparent high molecular weight material and a semi-transparent high molecular weight material. Furthermore, the material of the transparent part 110 is selected from the following group consisting of acrylic resin (PMMA), polyurethane (PU), polyvinyl chloride (PVC), epoxy resin and unsaturated polyester (UP). Also, as shown in FIG. 13, the transparent part 110 can, for example, have a central portion thicker than a peripheral portion. Further, the transparent part 110 can be designed to be round, elliptical, tetragonal or in any other suitable shapes, from the top view. Preferably, the transparent thermosetting plastic part 110 is in an elliptical shape, from the top view.

Furthermore, the high molecular weight layer 120 encircles the transparent part 110. The high molecular weight layer 120 can be, for example but not limited to, a polyurethane foam layer. It should be noticed that, the high molecular weight layer 120 has an attrition rate equivalent to that of the transparent part 110. In addition, as shown in FIG. 6, the polishing pad 140 can, for example, further comprise a thermal adhesive 150 disposed between the transparent part 110 and the high molecular weight layer 120.

Then, FIGS. 5, 11, 12 and 13 are used to describe a polishing pad structure of the other embodiment of the present invention. As shown in FIG. 11, the polishing pad 240 is provided. The polishing pad 240 comprises a transparent part 210, a first high molecular weight layer 220 and a second high molecular weight layer 222. Noticeably, the transparent part 210 can, for example, have an uneven side surface and the profile of the uneven side surface can be, for example, selected from a group consisting of a serrated shape 131, a wavy shape 133 and a toothed shape 135 shown in FIG. 5. The material of the transparent part 210 is as same as that of the transparent part 110 described in previous embodiment and is not introduced herein. In addition, as shown in FIG. 13, the transparent part 210 can, for example, have a central portion thicker than a peripheral portion. Further, the transparent part 210 can be designed to be round, elliptical, tetragonal or in any other suitable shapes, from the top view. Preferably, the transparent thermosetting plastic part 210 is in an elliptical shape, from the top view.

Moreover, as shown in FIG. 11, the first high molecular weight layer 220 encircles a lower portion of the transparent part 210. The first high molecular weight layer 220 can be, for example, a polyurethane foam layer. Noticeably, the first high molecular weight layer 220 has an attrition rate equivalent to that of the transparent part.

Further, the second high molecular weight layer 222 is disposed on the first high molecular weight layer 220 and encloses an upper portion of the transparent part 210. The material of the second high molecular weight layer 222 can be, for example but not limited to, selected from the following group consisting of polyurethane (PU), silicon rubber, polybutyl rubber (PBR), polyvinyl chloride (PVC) latex and polyacrylic acid series (PMMA) latex. Also, the first high molecular weight layer 220 has a hardness larger than that of the second high molecular weight layer 222. Further, as shown in FIG. 12, the polishing pad 240 can, for example, comprise a thermal adhesive 250 disposed between the transparent part 210 and the first high molecular weight layer 220. Meanwhile, the thermal adhesive 250 is also disposed between the transparent part 210 and the second high molecular weight layer 222.

In conclusion, the present invention has at least the following advantages:

1. Since the transparent thermosetting plastic part and the high molecular weight foam become hardened at the same time, the method of the present invention can lessen the distortion or deformation of the transparent thermosetting plastic part and the high molecular weight foam resulting from hardening at different time points. The method of the present invention for manufacturing the polishing pad having the detection window can increase planarity of the polishing pad.

2. The method of the present invention for manufacturing the polishing pad having the detection window further comprises coating an incomplete reactive material on the transparent thermosetting plastic part, in order to enhance adhesion of the transparent thermosetting plastic part and the polishing pad, so that the slurry will not leak from the cleavage between the transparent thermosetting plastic part and the polishing pad.

3. In the manufacturing method of the present invention, the side surface of the transparent thermosetting plastic part is designed to be uneven and rugged. Since the side surface of the transparent thermosetting plastic part is uneven, the total contact area between the transparent thermosetting plastic part and the high molecular weight foam is increased and the adhesion between the two is strengthened. The shape of the transparent thermosetting plastic part is not limited.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A polishing pad, comprising:
    a transparent part having an uneven side surface, the uneven side surface having a plurality of projections, a plurality of recessions, or combination thereof, wherein the profile of the uneven side surface is selected from the group consisting of a serrated shape, a wavy shape and a toothed shape; and
    a high molecular weight layer encircling the transparent part,
    wherein said transparent part is a non-hollow plug of transparent material that extends from a first surface of said high molecular weight layer to an opposite second surface of said high molecular weight layer, and
    wherein said transparent part does not protrude from said first surface and said second surface.

2. The polishing pad of claim 1, wherein a material of the transparent part is a thermosetting plastic.

3. The polishing pad of claim 1, wherein a material of the transparent part is selected from the following group consisting of acrylic resin, polymethyl methacrylate (PMMA), polyurethane (PU), polyvinyl chloride (PVC), epoxy resin and unsaturated polyester (UP).

4. The polishing pad of claim 1, wherein the transparent part has a central portion thicker than a peripheral portion.

5. The polishing pad of claim 1, wherein the transparent part has a shape selected from the following group consisting of round, elliptical and tetragonal.

6. The polishing pad of claim 1, wherein the high molecular weight layer is a polyurethane foam layer.

7. The polishing pad of claim 1, wherein the high molecular weight layer has an attrition rate equivalent to that of the transparent part.

8. The polishing pad of claim 1 further comprising a thermal adhesive disposed between the transparent part and the high molecular weight layer.

9. A polishing pad, comprising:
a transparent part having an uneven side surface, the uneven side surface having a plurality of projections, a plurality of recessions, or combination thereof, wherein the profile of the uneven side surface is selected from the group consisting of a serrated shape, a wavy shape and a toothed shape;
a first high molecular weight layer encircling a lower portion of the transparent part; and
a second high molecular weight layer disposed on the first high molecular weight layer and enclosing an upper portion of the transparent part,
wherein said transparent part is a non-hollow plug of transparent material that extends from a first outer surface of said first high molecular weight layer to a second outer surface of said second high molecular weight layer, said first outer surface and said second outer surface not being in contact with one another, and
wherein said transparent part does not protrude from said first outer surface and said second outer surface.

10. The polishing pad of claim 9, wherein a material of the transparent part is a thermosetting plastic.

11. The polishing pad of claim 9, wherein a material of the transparent part is selected from the following group consisting of acrylic resin, polymethyl methacrylate (PMMA), polyurethane (PU), polyvinyl chloride (PVC), epoxy resin and unsaturated polyester (UP).

12. The polishing pad of claim 9, wherein the transparent part has a central portion thicker than a peripheral portion.

13. The polishing pad of claim 9, wherein the transparent part has a shape selected from the following group consisting of round, elliptical and tetragonal.

14. The polishing pad of claim 9, wherein the first high molecular weight layer is a polyurethane foam layer.

15. The polishing pad of claim 9, wherein the first high molecular weight layer has an attrition rate equivalent to that of the transparent part.

16. The polishing pad of claim 9, wherein a material of the second high molecular weight layer is selected from the following group consisting of polyurethane (PU), silicon rubber, polybutyl rubber (PBR), polyvinyl chloride (PVC) latex and polyacrylic acid series (PMMA) latex.

17. The polishing pad of claim 9, wherein the first high molecular weight layer has a hardness larger than that of the second high molecular weight layer.

18. A polishing pad, comprising:
a transparent part having an uneven side surface, the uneven side surface having a plurality of projections, a plurality of recessions, or combination thereof, wherein the profile of the uneven side surface is selected from the group consisting of a serrated shape, a wavy shape and a toothed shape;
a first high molecular weight layer encircling a lower portion of the transparent part;
a second high molecular weight layer disposed on the first high molecular weight layer and enclosing an upper portion of the transparent part; and
a thermal adhesive disposed between the transparent part and the first high molecular weight layer.

19. A polishing pad, comprising:
a transparent part having an uneven side surface, the uneven side surface having a plurality of projections, a plurality of recessions, or combination thereof, wherein the profile of the uneven side surface is selected from the group consisting of a serrated shape, a wavy shape and a toothed shape;
a first high molecular weight layer encircling a lower portion of the transparent part;
a second high molecular weight layer disposed on the first high molecular weight layer and enclosing an upper portion of the transparent part; and
a thermal adhesive disposed between the transparent part and the second high molecular weight layer.

20. A polishing pad, comprising:
a transparent part having a side surface;
a high molecular weight layer encircling the transparent part; and
a thermal adhesive disposed between the high molecular weight layer and the side surface of the transparent part, wherein the thermal adhesive is coated on the side surface of the transparent part extending from a first surface of said polishing pad to an opposite second surface of said polishing pad, wherein
the side surface of the transparent part is an uneven surface having a plurality of projections, a plurality of recessions, or combination thereof.

21. The polishing pad of claim 20, wherein a material of the transparent part is a thermosetting plastic.

22. The polishing pad of claim 20, wherein a material of the transparent part is selected from the following group consisting of acrylic resin, polymethyl methacrylate (PMMA), polyurethane (PU), polyvinyl chloride (PVC), epoxy resin and unsaturated polyester (UP).

23. The polishing pad of claim 20, wherein the transparent part has a central portion thicker than a peripheral portion.

24. The polishing pad of claim 20, wherein the transparent part has a shape selected from the following group consisting of round, elliptical and tetragonal.

25. The polishing pad of claim 20, wherein the high molecular weight layer is a polyurethane foam layer.

26. The polishing pad of claim 20, wherein the high molecular weight layer has an attrition rate equivalent to that of the transparent part.

27. The polishing pad of claim 20, wherein the side surface of the transparent part is configured to have a shape selected from the following group consisting of a serrated shape, a wavy shape and a toothed shape.

28. The polishing pad of claim 20, further comprising a chemical bonding between the adhesive and the high molecular weight layer.

29. The polishing pad of claim 20, further comprising a chemical bonding between the adhesive layer and the transparent part.

* * * * *